3,235,594
N-ACYL-α-AMINO ACID AMIDES
Irving Levi, Montreal, and John W. R. Weed, St. Bruno,
Quebec, Canada, assignors to Charles E. Frosst & Co.,
a corporation of Quebec
No Drawing. Filed Apr. 2, 1962, Ser. No. 184,522
13 Claims. (Cl. 260—558)

This invention relates to a group of novel amino acid amides and to methods for their production. More specifically it relates to a group of N,N-bis-(haloalkyl)-N'-acylated α-amino acid amides and to the method for their preparation.

The class of compounds known as nitrogen mustards, having the following general formula:

(I)
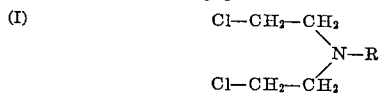

where R represents a *wide variety* of alkyl and aryl radicals, has the ability to inhibit tumor growth. Because of this property, the nitrogen mustards have been employed for a number of years in laboratory investigations and in the clinical treatment of malignant growths. Unfortunately, the effective dose of nitrogen mustards is in many cases so close to the dose which produces serious toxic effects in the host as to render them unsuitable for prolonged chemotherapeutic use. It is therefore desirable to find a nitrogen mustard or class of nitrogen mustard type compounds possessing the high carcinolytic activity of the parent compound but having a greatly reduced general toxicity.

In accordance with the present invention there is now provided novel derivatives of nitrogen mustard which possess the in vivo antitumor activity of nitrogen mustard but in which the undesirable toxicity and side reaction have been greatly reduced.

The products of the present invention are N,N-bis-(haloalkyl)-N'-acylated α-amino acid amides selected from the group consisting of N,N-bis-(2-chloroethyl)-2-(2,2-dichloroacetamido) acetamide, N,N-bis-(2-chloroethyl)-2-benzamidoacetamide, N,N-bis-(2-chloroethyl)-2-acetamidopropionamide, N,N-bis - (2-chloroethyl)-2-benzamidopropionamide, N,N-bis-(2 - chloroethyl)-2-(acetamido)-hydrocinnamamide, N,N-bis-(2 - chloroethyl)-2-(2,2-dichloroacetamido)-hydrocinnamamide, N,N-bis-(2-chloroethyl)-2-benzamido-hydrocinnamamide, N,N - bis - (2-chloroethyl)-2-acetamido isovaleramide, N,N - bis - (2-chloroethyl) - 2 - acetamidoisocaproamide, N,N-bis-(2-chloroethyl)-2-(2,2 - dichloroacetamido) - hexanamide, N,N-bis-(2 - chloroethyl)-2-(2,2,2 - trichloroacetamido) hydrocinnamamide, N,N-bis-(2-chloropropyl)-2-(2,2-dichloroacetamido)-hydrocinnamamide, N,N-bis-(2-chloroethyl)-2-(2,2-dichloroacetamido)-propionamide.

These novel amide compounds of this invention are prepared by condensing with the elimination of water N-acylated-α-amino acids with nitrogen mustards in the presence of a dehydrating agent, and in an inert solvent such as tetrahydrofuran, at temperatures ranging from 0° to 100° C. The dehydrating agent is a carbodiimide preferably dicyclohexylcarbodiimide. The reaction may be illustrated as follows:

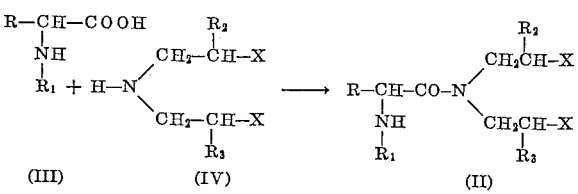

In accordance with the present invention it has been found that the novel N,N-bis-(haloalkyl)-N'-acylated α-amino acid amides identified above possess a most favourable and unexpected selectivity of action on animal tumors which renders them highly suitable as chemotherapeutic agents because of their reduced toxicity. Accordingly, therapeutically effective doses of the novel acid amides can be administered to a host without fear of approaching the toxic doses, a situation which is so common in presently employed nitrogen mustards.

The mode of action of the novel acid amides of the present invention may be summarized briefly as follows: The amide linkage masks the alkylating and toxic properties of the nitrogen-mustard moiety so that the total host is not subjected to undesirable toxic effects normally associated with nitrogen-mustard therapy: the amino acid moiety of the molecule facilitates the selective deilvery of the "masked" nitrogen mustard via the amino acid transport mechanism into the tumor cells, where the higher amidase activity of the tumor cell liberates the reactivated nitrogen mustard within itself. Thus in effect we are able to obtain maximum effect of the nitrogen mustard on the tumor and minimum toxic effect on the host.

The products of this invention were tested for cytotoxic activity against carcinosarcoma 256 in rats according to the following procedure. Wistar rats weighing 100–150 grams were used as hosts for Walker 256 carcinosarcoma. The animals were caged in groups of five, fed water and biscuits of complete animal feed ad libitum.

The tumors were transplanted under conditions of "clean" technique, care being taken to avoid contamination. Fresh tumor slices free from necrotic areas were macerated with scalpel and scissors in sterile petri dishes. When tumor fragments were small enough to pass a #18 hypodermic needle they were transplanted subcutaneously under the skin on the backs of the animals, mid-way between the head and the root of the tail. These transplanted Walker 256 tumors were allowed to grow for seven days before testing was begun. The tumor volumes were determined by caliper measurement, the product of the length, width and thickness in centimeters being considered the volume of the tumor.

The amino acid-nitrogen mustard amide was suspended in gumacacia and injected intraperitoneally into the rat. The animals were treated and the tumors were measured daily. For example in the case of N,N-bis (2-chloroethyl)-2-acetamido hydrocinnamamide 50 mg./kg. of compound was injected daily for 10 days at the end of compound was injected daily for 10 days at the end of which time the average volume of the tumors of five animals was 0.5 cubic centimeter. This represents practically no increase in tumor volume over the volume of the tumor on the day treatment was started. The tumors of the nontreated control animals, however, increased in volume to approximately 24 cubic centimeters during this period. After the twenty-second day the tumor volume of the treated rats still did not increase while the tumors of the non-treated control animals were now approximately 55 ccs. in volume. The compound therefore caused practically complete inhibition of growth of carcinosarcoma 256 in rats in the above described method of treatment. The acute toxicity of this compound in rats was determined by intraperitoneal injection. The $LD_{50}$ was found to be approximately 1.9 grams per kilo. The ratio of toxic dose to therapeutic dose is therefore approximately 38 which is considerably higher than the usual ratio found for nitrogen mustards employed clinically. Autopsy performed on mice after injection of a lethal dose (1000 mg./kg.) of N,N-bis-(2-chloroethyl)-2-(2,2-dichloroacetamido)-acetamide [Formula V (R=H, $R^1$=COCHl$_2$, $R^2$ and $R^3$=H, X=Cl] showed that there were no gross lesions present and that all organs appeared perfectly normal.

It will be appreciated by those skilled in the art that the chemical structure of all α-amino acids (except glycine), their N-acylated derivatives, as well as the corresponding N-acylated-α-amino acid-nitrogen mustard amides described in this invention contain an asymmetric carbon atom and are therefore capable of existing in two optically active forms known as enantiomers. Because of the difficulty of representing these structural differences in graphic formulae, the customary structural formulae have been used in both the specification and the claim without distinction as to the particular structural and optical configurations of the compound. However, it should be expressly understood that while no notation has been used to make the distinction referred to above, the formulae used are to be interpreted in their generic sense, that is representing D-, L- or DL-amino acid derivatives, that is either the separate isomers or the optical racemates. Such a formula does not merely represent the unresolved mixture of isomers.

In order to illustrate the preparation of the new products of the present invention reference is made to the following examples but it is understood that these examples are given primarily by way of illustration and not of limitation.

Example 1

N-dichloroacetyl glycine (9.7 g., 0.051 mole) was added to a solution of di-(2-chloroethyl)-amine (7.4 g., 0.051 mole) in 60 ml. tetrahydrofuran. This stirred solution was maintained at room temperature by immersion in a water bath and N,N'-dicyclohexylcarbodiimide (10.7 g., 0.051 mole) in 60 ml. tetrahydrofuran was added in a dropwise manner over a period of 30 minutes. Stirring was then continued for an additional 30 minutes and the practically quantitative precipitate of N,N'-dicyclohexylurea which was identified by melting point and infrared absorption curve, was removed by filtration and washed with tetrahydrofuran. The combined filtrate and washings were evaporated to dryness and the residual solid mass was crystallized from ethyl acetate-petroleum ether (30–60° C.). This yielded 3.0 grams (18.6% yield) of N,N-bis - (2-chloroethyl) - 2-(2,2-dichloroacetamido)-acetamide, M.P. 62.5–63.5° C. In other preparations yields up to 38.5% were obtained. The compound was soluble in warm ether and ethyl acetate and insoluble in benzene and petroleum ether. The infrared absorption spectrum exhibited a maximum at 1631 cm.$^{-1}$ characteristic of a disubstituted amide linkage. Calculated for $C_8H_{12}Cl_4N_2O_2$: C, 30.99; H, 3.90; N, 9.04. Found: C, 30.87; H, 4.06; N, 9.10.

This compound is N,N-bis-(2-chloroethyl)-2-(2,2-dichloroacetamido)-acetamide and the formula of this compound is

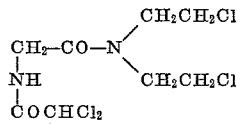

Example 2

N-benzoyl glycine (10.91 g.) and di-(2-chloroethyl)-amine (8.65 g.) were both dissolved in 150 ml. tetrahydrofuran and to this was added in one lot 12.58 g. N,N'-dicyclohexylcarbodiimide. The latter also dissolved in the tetrahydrofuran and reaction proceeded fairly rapidly causing N,N'-dicyclohexylurea to precipitate out of the solution in practically quantitative yield. The latter was removed by filtration, washed with tetrahydrofuran, dried and identified by melting point and infra-red absorption curve. The combined filtrate and washings were evaporated to yield a light yellow oil which was redissolved in 150 ml. ethyl acetate. This solution was washed successively with 10% acetic acid (15 ml.), 2% sodium bicarbonate (2 x 15 ml.) and water (15 ml.), then dried over anhydrous MgSO$_4$, filtered and concentrated to yield 55% of N,N-bis-(2-chloroethyl)-2-benzamidoacetamide as a white crystalline product, M.P. 92–4° C. and having the structure shown below. Calcaulated for $C_{13}H_{16}Cl_2N_2O_2$: C, 51.50; H, 5.32; N, 9.24. Found: C, 52.43; H, 5.42; N, 9.09.

The infrared absorption spectrum exhibited a maximum at 1629 cm.$^{-1}$ characteristic of a disubstituted amide leakage.

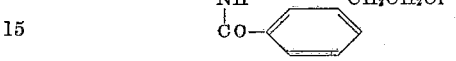

Example 3

N-acetyl alanine (6.80 g., 0.052 mole), di-(2-chloroethyl)-amine (7.35 g.) and N,N'-dicyclohexylcarbodiimide (10.7 g., 0.052 mole) were reacted in tetrahydrofuran according to the procedure given in Example 1. The product was obtained as a white crystalline powder (6.1 gram, 46.2% yield) M.P. 85–86° C. Calculated for $C_9H_{16}Cl_2N_2O_2$: C, 42.36; H, 6.32; N, 10.98. Found: C, 42.88; H, 6.45; N, 10.78.

This product is N,N-bis-(2-chloroethyl)-2-acetamidopropionamide and has the structure indicated below. Its infrared absorption spectrum exhibited a maximum at 1629 cm.$^{-1}$ which is characteristic of a disubstituted amide linkage.

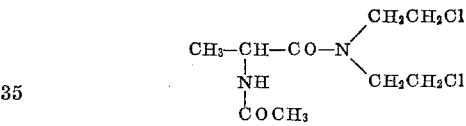

Example 4

A tetrahydrofuran solution containing 15.4 grams of di-(2-chloroethyl)-amine and 21.7 grams of N-dichloroacetyl-alanine was treated with 22.4 grams of N,N'-dicyclohexylcarbodiimide as described in Example 6. The purified crystalline product was the desired N,N-bis-(2-chloroethyl) - 2 - (2,2-dichloroacetamido)-propionamide, M.P. 114–116° C. Its infrared absorption curve exhibited the usual maximum at 1631 cm.$^{-1}$ which is characteristic of a disubstituted amide leakage. Calculated for $C_9H_{14}Cl_4N_2O_2$: C, 33.36; H, 4.35; N, 8.65. Found: C, 33.69; H, 4.54; N, 8.41.

It had the following structure:

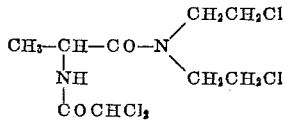

Example 5

N-benzoyl-amine (10.2 g., 0.053 mole) and di-(2-chloroethyl)-amine (7.5 g., 0.053 mole) were dissolved in 100 ml. tetrahydrofuran. To this was added 10.9 g. (0.053 mole) N,N'-dicyclohexylcarbodiimide. Reaction set in within a few minutes and white crystalline N,N'-dicyclohexylurea precipitated nearly quantitatively. After standing at room temperature for one hour the latter was removed by filtration and the filtrate concentrated to yield a pale yellow residual oil. This was redissolved in ethyl acetate and the solution washed successively with 10% acetic acid (15 ml.), 2% sodium bicarbonate (2 x 15 ml.) and water (15 ml.), then dried over anhydrous MgSO$_4$, reduced in volume to approximately 20 ml. and refrigerated. The product, N,N-bis-(2-chloroethyl)-2-benzamidopropionamide (5.7 g.), M.P. 93–94.5° C., crystallized as white microcrystals. Calculated for $C_{14}H_{18}Cl_2N_2O_2$: C, 53.01; H, 5.72; N, 8.83. Found: C, 53.59; H, 5.76; N, 8.48.

Its infrared absorption curve exhibited a maximum at 1626 cm.⁻¹, characteristic of a tertiary amide bond.

The structure of this compound is:

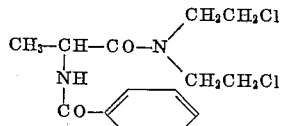

Example 6

N,N'-dicyclohexylcarbodiimide (13.45 g., 0.065 mole) dissolved in 50 ml. tetrahydrofuran was added in a dropwise manner over a period of 30 minutes to a stirred solution of N-acetyl-phenylalanine (13.5 g., 0.065 mole) and di-(2-chloroethyl)-amine (9.25 g., 0.065 mole) in 100 ml. tetrahydrofuran. The reaction mixture was maintained at room temperature by means of a water bath. Stirring was continued for an additional hour and the precipitated dicyclohexylurea was removed by filtration and washed with tetrahydrofuran. The nearly quantitative yield of N,N'-dicyclohexylurea (13.9 g.) (theory 14.6 g.) was identified by melting point and infrared absorption curve.

The combined filtrate and washings were evaporated to yield a light yellow oil which was redissolved in ethyl acetate (100 ml.) and refrigerated for one hour. This caused a further small amount of dicyclohexylurea (0.2 g.) to precipitate which was also removed by filtration. The filtrate was washed successively with 10% acetic acid (15 ml.), 2% sodium bicarbonate (2 x 15 ml.) and water (15 ml.), dried over anhydrous MgSO₄ and concentrated to yield 15.3 g. of a light yellow colored oil which slowly solidified (70% yield). Several crystallizations from ethyl acetate-ether yielded approximately 50% of pure white crystals of N,N-bis-(2-chloroethyl)-2-(acetamido)-hydrocinnamamide. M.P. 119–121° C. The infrared absorption spectrum exhibited a maximum at 1629 cm.⁻¹ characteristic of a disubstituted amide linkage. *Analysis.*—Calc. for $C_{15}H_{20}Cl_2N_2O_2$: C, 54.39; H, 6.09; N, 8.45. Found: C, 54.15; H, 6.21; N, 8.33.

This product has the formula:

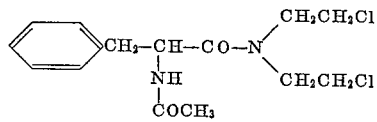

Example 7

N,N-bis-(2-chloroethyl)-2-(2,2 - dichloroacetamido)-hydrocinnamamide was prepared according to procedure given in Example 1 from di-(2-chloroethyl)-amine (7.1 g.), N-dichloroacetyl phenylalanine (13.8 g., 0.05 mole) and N,N'-dicyclohexylcarbodiimide (10.53 g., 0.05 mole) in tetrahydrofuran. The product (47.6% yield) which melted at 147–8° C., exhibited an infrared absorption maximum at 1615 cm.⁻¹ and had the structure indicated below. Calculated for $C_{15}H_{18}Cl_4N_2O_2$: C, 45.02; H, 4.53; N, 7.00. Found: C, 44.78; H, 4.81; N, 6.98.

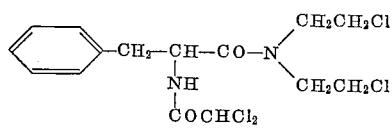

Example 8

N-benzoyl-phenylalanine (15.1 g., 0.056 mole), di-(2-chloroethyl)-amine (7.9 g., 0.056 mole) and N,N'-dicyclohexylcarbodiimide (11.6 g., 0.056 mole) were reacted in tetrahydrofuran according to the procedure given in Example 6. The product, N,N-bis - (2 - chloroethyl)-2-benzamidohydrocinnamamide, was obtained as a white crystalline powder. It melted at 133–135° C. and its infrared absorption curve exhibited a maximum at 1628 cm.⁻¹ which is characteristic of a disubstituted amide linkage. Calculated for $C_{20}H_{22}Cl_2N_2O_2$: C, 61.07; H, 5.64; N, 7.12. Found: C, 61.04; H, 5.83; N, 7.07.

The structure of this compound is:

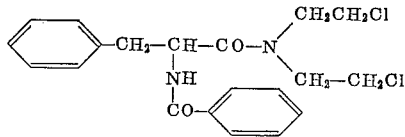

Example 9

N-acetyl valine (8.18 g., 0.051 mole), di-(2-chloroethyl)-amine (7.3 g., 0.051 mole) and N,N'-dicyclohexylcarbodiimide (10.6 g., 0.051 mole) were reacted in tetrahydrofuran according to the procedure given in Example 1. The product, N,N-bis-(2-chloroethyl) - 2 - acetamidoisovaleramide, was obtained as a white crystalline powder. It melted at 90° C. and its infrared absorption curve exhibited a maximum at 1630 cm.⁻¹ which is characteristic of a disubstituted amide linkage. Calculated for $C_{11}H_{20}Cl_2N_2O_2$: C, 46.65; H, 7.12; N, 9.89. Found: C, 46.82; H, 7.13; N, 9.72.

The structure of this compound is:

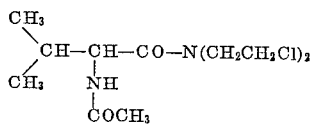

Example 10

N-acetyl leucine (9.58 g., 0.055 mole), di-(2-chloroethyl)-amine (7.8 g., 0.055 mole) and N,N'-dicyclohexylcarbodiimide (11.35 g., 0.055 mole) were reacted in tetrahydrofuran according to the procedure given in Example 1. The product, N,N-bis-(2-chloroethyl)-2-acetamidoisocaproamide, was obtained as a white crystalline powder. It melted at 92–3° C. and its infrared absorption curve exhibited a maximum at 1634 cm.⁻¹ which is characteristic of a disubstituted amide linkage. Calculated for $C_{12}H_{22}Cl_2N_2O_2$: C, 48.49; H, 7.46; N, 9.42. Found: C, 48.86; H, 7.58; N, 9.26.

The structure of this compound is:

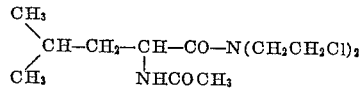

Example 11

N-dichloroacetyl norleucine (11.93 g., 0.049 mole), di-(2-chloroethyl)-amine (7.0 g.) and N,N'-dicyclohexylcarbodiimide (10.18 g., 0.049 mole) were reacted in tetrahydrofuran according to the procedure given above in Example 6. After removal of the quantitative yield of N,N'-dicyclohexylurea, M.P. 222–224° C., the product, N,N - bis - (2 - chloroethyl) - 2 - (2,2 - dichloroacetamido)-hexanamide, was obtained as a pale yellow oil. Its infrared absorption curve exhibited a maximum at 1626 cm.⁻¹ which is characteristic of a tertiary amide linkage.

The compound has the following structure:

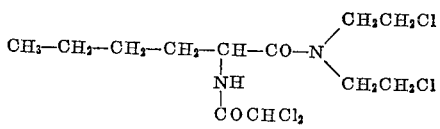

Example 12

N-trichloroacetyl phenylalanine (16.0 g., 0.052 mole), di-(2-chloroethyl)-amine (7.35 g., 0.052 mole), and N,N'-dicyclohexylcarbodiimide (10.68 g., 0.052 mole) were reacted in tetrahydrofuran according to the procedure given in Example 1. The white crystalline product at 118° C. and its infrared absorption curve exhibited a maximum at 1637 cm.⁻¹ characteristic for a tertiary amide linkage. Calculated for $C_{15}H_{17}Cl_5N_2O_2$: C, 41.45; H, 3.94; N, 6.45. Found: C, 42.16; H, 4.04; N, 6.28.

This compound is N,N-bis-(2-chloroethyl)-2-(2,2,2-trichloroacetamido)-hydrocinnamamide and has the following structure:

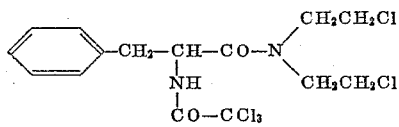

*Example 13*

A solution of 4.7 grams of dicyclohexylcarbodiimide in 50 ml. tetrahydrofuran was added dropwise over a period of thirty minutes to a solution of 3.87 grams di-(2-chloropropyl) - amine and 6.28 grams N - dichloroacetyl phenylalanine in 50 ml. tethahydrofuran. The reaction flask was kept at room temperature by immersion in a water bath. Stirring was continued for an additional thirty minutes and the product N,N-bis-(2-chloropropyl)-2-(2,2-dichloroacetamido)-hydrocinnamamide was isolated according to the procedure given in Example 1. The white crystalline product melted at 122–3° C. and its infrared absorption spectrum exhibited a maximum at 1620 cm.$^{-1}$ characteristic of a disubstituted amide linkage. Calculated for $C_{17}H_{22}Cl_4N_2O_2$: C, 47.68; H, 5.18; N, 6.54. Found: C, 48.38; H, 5.36; N, 6.42.

The structure of this compound is:

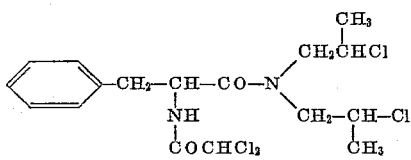

We claim:
1. N,N - bis - (2 - chloroethyl) - 2 - (2,2 - dichloroacetamido)-acetamide.
2. N,N-bis-(2-chloroethyl)-2-benzamidoacetamide.
3. N,N-bis-(2-chloroethyl)-2-acetamidopropionamide.
4. N,N-bis-(2-chloroethyl)-2-benzamidopropionamide.
5. N,N - bis - (2 - chloroethyl) - 2 - (acetamido) - hydrocinnamide.
6. N,N - bis - (2 - chloroethyl) - 2 - (2,2 - dichloroacetamide)-hydrocinnamamide.
7. N,N - bis - (2 - chloroethyl) - 2 - benzamido - hydrocinnamamide.
8. N,N - bis - (2 - chloroethyl) - 2 - acetamido isovaleramide.
9. N,N-bis-(2-chloroethyl)-2-acetamidoisocaproamide.
10. N,N - bis - (2 - chloroethyl) - 2 - (2,2 - dichloroacetamido)-hexanamide.
11. N,N - bis - (2 - chloroethyl) - 2 - (2,2,2 - trichloroacetamido)-hydrocinnamamide.
12. N,N - bis - (2 - chloropropyl) - 2 - (2,2 - dichloroacetamido)-hydrocinnamamide.
13. N,N - bis - (2 - chloroethyl) - 2 - (2,2 - dichloroacetamido)-propionamide.

References Cited by the Examiner

UNITED STATES PATENTS 2,447,587   8/1948   Martin et al. _____ 260—559 X

OTHER REFERENCES

Beilstein's Handbuch, volume 9, page 236, 4th edition (1926).

WALTER A. MODANCE, *Primary Examiner.*

IRVING MARCUS, NICHOLAS S. RIZZO, JOHN D. RANDOLPH, *Examiners.*